United States Patent [19]

Khulbe et al.

[11] Patent Number: 4,923,838

[45] Date of Patent: May 8, 1990

[54] PROCESS FOR PREPARING AN IRON-COAL SLURRY CATALYST FOR HYDROCRACKING HEAVY OILS

[75] Inventors: Chandra P. Khulbe, Oakville; Keith Belinko, Nepean; Richard J. Waugh, Oakville; Michel Perreault, Montreal, all of Canada

[73] Assignee: Petro-Canada Inc., Mississauga, Canada

[21] Appl. No.: 304,557

[22] Filed: Feb. 1, 1989

[30] Foreign Application Priority Data

Feb. 2, 1988 [CA] Canada .................................. 557988

[51] Int. Cl.⁵ ...................... B01J 31/02; B01J 37/04; C10G 47/02; C10G 1/08
[52] U.S. Cl. .................................. 502/151; 208/112; 208/423; 502/150
[58] Field of Search ............... 502/151, 150, 169, 173, 502/185

[56] References Cited

U.S. PATENT DOCUMENTS

| | | | |
|---|---|---|---|
| 2,572,061 | 10/1951 | Sellers | 196/53 |
| 3,755,137 | 8/1973 | Schuman | 208/10 |
| 4,260,472 | 4/1981 | Eisenlohr et al. | 208/8 LE |
| 4,376,695 | 3/1983 | Belinko et al. | 208/59 |
| 4,435,280 | 3/1984 | Ranganathan et al. | 208/112 |
| 4,437,972 | 3/1984 | Derbyshire et al. | 208/8 LE |
| 4,486,293 | 12/1984 | Garg | 208/10 |
| 4,495,306 | 1/1985 | Budahn | 502/185 |
| 4,557,822 | 12/1985 | Bearden, Jr. et al. | 208/112 |

*Primary Examiner*—Paul E. Konopka
*Attorney, Agent, or Firm*—Fisher, Christen & Sabol

[57] ABSTRACT

A process for the conversion of a heavy hydrocarbon oil in the presence of hydrogen and iron-coal catalyst is described in which the iron-coal catalyst is prepared by grinding coal particles and particles of an iron compound in oil to form an additive slurry or paste and mixing the coal-iron oil slurry or paste with the heavy hydrocarbon oil to form a feedstock to a hydroconverter.

9 Claims, 1 Drawing Sheet

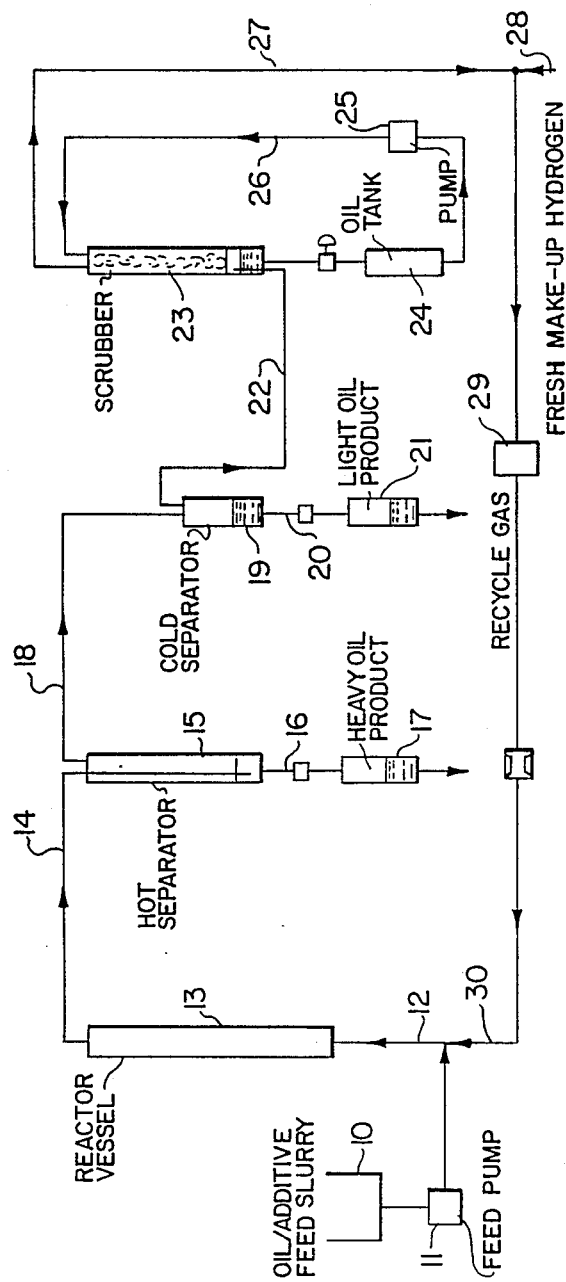
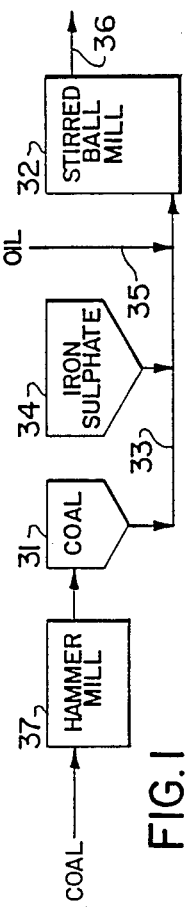
FIG. 2
FIG. 1

PROCESS FOR PREPARING AN IRON-COAL SLURRY CATALYST FOR HYDROCRACKING HEAVY OILS

This invention relates to the treatment of hydrocarbon oils and, more particularly, to the hydrocracking of heavy hydrocarbon oils in the presence of iron and coal additives.

Hydrocracking processes for the conversion of heavy hydrocarbon oils to light and intermediate naphthas of good quality for reforming feed stocks, fuel oil and gas oil are well known. These heavy hydrocarbon oils can be such materials as pertroleum crude oil, atmospheric tar bottoms products, vacuum tar bottoms products, heavy cycle oils, shale oils, coal derived liquids, crude oil residuum, topped crude oils and the heavy bituminous coils extracted from oil sands. Of particular interest are the oils extracted from oil sands and which contain wide boiling range materials from naphthas through kerosene, gas oil, pitch, etc. and which contain a large portion of material boiling above 524° C., equivalent atmospheric boiling point.

As the reserves of conventional crude oils decline, these heavy oils must be upgraded to meet the demands. In this upgrading, the heavier material is converted to lighter fractions and most of the sulphur, nitrogen and metals must be removed.

This can be done either by a coking process, such as delayed or fluidized coking, or by a hydrogen addition process such as thermal or catalytic hydrocracking. The distillate yield from the coking process is about 70 wt % and this process also yields about 25 wt % coke as by-product which cannot be used as fuel because of low hydrogen:carbon ratio, and high mineral and sulphur content.

Work has also been done on an alternate processing route involving hydrogen addition at high pressures and temperatures and this has been found to be quite promising. In this process, hydrogen and heavy oil are pumped upwardly through an empty tubular reactor in the absence of any catalyst. It has been found that the high molecular weight compounds hydrogenate and/or hydrocrack into lower boiling ranges. Simultaneous desulphurization, demetallization and denitrogenation reactions take place. Reaction pressures up to 24 MPa and temperatures up to 490° C. have been employed.

In thermal hydrocracking, the major problem is coke or solid deposition in the reactor, especially when operating at relatively low pressures, and this can result in costly shut-downs. Higher pressures reduce reactor fouling. At 24 MPa and 470° C., the coke deposition can be substantially eliminated. However, plant operations at high pressures involve higher capital and operating costs.

It has been well established that mineral matter present in the feed stock plays an important role in coke deposition. Chervenak et al, U.S. Pat. No. 3,775,296 shows that feed stock containing high mineral content (3.8 wt. %) has less tendency to form coke in the reactor than feed containing low mineral matter (<1 wt %). Other studies have shown that a high mineral content had no apparent effect on pitch conversion and desulphurization, but suppress coke deposition in the reactor and general reactor fouling.

The addition of coke carriers was propposed in Schuman et al. U.S. Pat. No. 3,151,057, who suggested the use of "getters" such as sand, quartz, alumina, magnesia, zircon, beryl or bauxite. These "getters" could be regenerated after use by heating the fouled carrier with oxygen and steam at about 1090° C. to yield regeneration-product-gases containing a substantial amount of hydrogen. It has been shown in Ternan et al, Canadian Patent 1,073,389 issued Mar. 10, 1980 and Ranganathan et al, U.S. Pat. No. 4,214,977 issued July 29, 1980, that the addition of coal or coal-based catalyst results in a reduction of coke deposition during hydrocracking. The coal additives act as sites for the deposition of coke precursors and thus provide a mechanism for their removal from the system.

The use of these coal based catalysts allow operation at lower pressures and at higher conversions. The use of coal and Co, Mo and Al on coal catalysts are described in Canadian Patent 1,073,389, the use of iron-coal catalysts in U.S. Pat. No. 4,214,977 and the use of fly ash in Canadian Patent 1,124,194.

In U.S. Pat. No. 3,775,286, a process is described for hydrogenating coal in which the coal was either impregnated with hydrated iron oxide or dry hydrated iron oxide powder was physically mixed with powdered coal. Canadian Patent 1,202,588 describes a process for hydrocracking heavy oils in the presence of an additive in the form of a dry mixture of coal and an iron salt, such as iron sulphate. However, the conversion rates using the physical mixture were quite poor compared with the impregnated coal. Also, dry grinding and/or mixing of iron and coal is a dangerous and difficult procedure.

It is the object of the present invention to utilize an inexpensive disposable carbon-based additive in a heavy hydrocarbon feedstock to overcome some of the problems of deposits forming in the reactor during the hydrocracking process.

SUMMARY OF THE INVENTION

According to the present invention, an improved iron-coal catalyst is prepared by grinding an iron compound and the coal or other solid carbonaceous material in oil to form an additive paste or slurry. The carbonaceous material and iron compound can be ground simultaneously while mixed with oil in a grinding mill, or the carbonaceous material and iron compound can be ground separately in oil and the two slurries can then be combined to form the iron-coal additive. This procedure avoids the problems of dry grinding and mixing and also the problems associated with wet impregnating and subsequent drying of coal particles. Moreover, it provides surprisingly improved results when used in the hydrocracking of heavy hydrocarbon oils.

Thus, an embodiment of this invention comprises a hydroconversion process in which a feed slurry comprising a heavy hydrocarbon oil and an iron-coal catalyst is contacted with a hydrogen-containing gas in a hydroconversion zone at hydroconversion conditions to convert it least a portion of the oil to lower boiling products and thereby produce a hydroconverted oil. The iron-coal catalyst is present in the feed slurry in an amount of up to 5% by weight, based on the oil, and in accordance with the present invention, the feed slurry is prepared by grinding carbonaceous (coal) particles and iron compound particles in oil to form an additive slurry or paste which contains both coal particles and iron particles and mixing the coal-iron oil slurry or paste obtained with the heavy hydrocarbon oil to form a feed slurry.

This process substantially prevents the formation of carbonaceous deposits in the reaction zone. These deposits, which may contain quinoline and benzene insoluble organic material, mineral matter, metals, sulphur, and little benzene soluble organic material will hereinafter be referred to as "coke" deposits.

The process of this invention is particularly well suited for the treatment of heavy oils having a large proportion, preferably at least 50% by volume, which boils above 524° C. and which may contain a wide boiling range of materials from naphtha through kerosene, gas oil and pitch. It can be operated at quite moderate pressure, preferably in the range of 3.5 to 24 MPa, without coke formation in the hydrocracking zone.

Although the hydrocracking can be carried out in a variety of known reactors of either up or down flow, it is particularly well suited to a tubular reactor through which feed and gas move upwardly. The effluent from the top is preferably separated in a hot separator and the gaseous stream from the hot separator can be fed to a low temperature-high pressure separator where it is separated into a gaseous stream containing hydrogen and less amounts of gaseous hydrocarbons and a liquid product stream containing light oil product.

The iron compound which is used for the additive is one which converts into iron sulphide from the action of hydrogen and hydrogen sulphide. It may be an iron oxide or an iron salt, with iron sulphate being particularly preferred. The carbonaceous component is preferably lignite or sub-bituminous coal, coal mine rejects or fly ash.

A typical additive mix may contain 10 to 90% by weight of the iron salt and 90 to 10% by weight of carbonaceous material. The additive is mixed with the heavy oil in an amount of about 0.1 to 5% by weight based on heavy oil feed.

The additive can conveniently be prepared by grinding coal or other carbonaceous material and iron salt to fine particle sizes in the presence of oil using a grinding mill. The oil used is preferably a process derived heavy gas oil and the grinding is preferably carried out at a high solids level in the range of 10 to 60 wt % solids.

The grinding mill used is preferably a ball or rod mill such as a stirred ball mill. A particularly effective grinding mill for this purpose is a Drais Perl Mill ®.

A mill of this type has an important advantage in that the coal and iron can be ground to a very small particle size. For instance, it can easily be ground to a particle size of less than 75μ and it has been found to be particularly advantageous to grind to particle sizes of less than 10μ.

According to a preferred embodiment, the iron-coal additive slurry is mixed with a heavy hydrocarbon oil feed and pumped along with hydrogen through a vertical reactor. The liquid-gas mixture from the top of the hydrocracking zone can be separated in a number of different ways. One possibility is to separate the liquid-gas mixture in a hot separator kept between 200°–470° C. and at the pressure of the hydrocracking reaction. The heavy hydrocarbon oil product from the hot separator can either be recycled or sent to secondary treatment.

The gaseous stream from the hot separator containing a mixture of hydrocarbon gases and hydrogen is further cooled and separated in a low temperature-high pressure separator. By using this type of separator, the outlet gaseous stream obtained contains mostly hydrogen with some impurities such as hydrogen sulphide and light hydrocarbon gases. This gaseous stream is passed through a scrubber and the scrubbed hydrogen is recycled as part of the hydrogen feed to the hydrocracking process. The recycled hydrogen gas purity is maintained by adjusting scrubbing conditions and by adding make up hydrogen.

The liquid stream from the low temperature-high pressure separator represents the light hydrocarbon oil product of the present process and can be sent for secondary treatment.

Some of the metal-coal additive will be carried over with the heavy oil product from the hot separator and will be found in the 524° C.+ pitch fraction. However, since this is a very cheap additive, it need not be recovered and can be burned or gasified with the pitch. At hydrocracking conditions, the metal salts are converted to metal sulphides.

For a better understanding of the invention, reference is made to the accompanying drawings which illustrates diagrammatically a preferred embodiment of the present invention. In the drawings, FIG. 1 is a schematic flow diagram showing the additive preparation; and FIG. 2 is a schematic flow diagram showing a hydrocracking process.

As illustrated in FIG. 1, coal as received from the mine is crushed in a hammer mill 37. This produces a crushed coal having a top size of about 8 or 16 mesh (U.S. Sieve) and this may be stored in storage bin 31. A weighted amount of crushed coal is fed from the bin 31 to grinding mill 32 via line 33. A weighted amount of iron compound from storage bins 34 is fed into line 33 or alternatively it may be fed directly into the grinding mill 32. A desired amount of oil or residue may be fed to the mill 32 or line 33 via inlet line 35. The additive/oil slurry produced in the mill is delivered via line 36 to either a slurry storage tank or to a hydrocracking plant inlet.

Although FIG. 1 shows coal and iron sulphate being ground simultaneously in grinding mill 32, it is also possible to grind the coal and iron sulphate separately in separate grinding mills and then combine the slurries formed by the separate mills. This procedure provides better control of the particle sizes.

In the hydrocracking process as shown in FIG. 2, the iron salt/coal additive slurry is mixed together with a heavy hydrocarbon oil feed in a feed tank 10 to form a slurry. This slurry is pumped via feed pump 11 through inlet line 12 into the bottom of an empty tower 13. Recycled hydrogen and make up hydrogen from line 30 is simultaneously fed into the tower through line 12. A gas-liquid mixture is withdrawn from the top of the tower through line 14 and introduced into a hot separator 15. In the hot separator the effluent from tower 13 is separated into a gaseous stream 18 and a liquid stream 16. The liquid stream 16 is in the form of heavy oil which is collected at 17.

According to an alternative feature, a branch line is connected to line 16. This branch line connects through a pump into inlet line 12, and serves as a recycle for recycling the liquid stream containing carried over metal sulphide particles and coal fines from hot separator 15 back into the feed slurry to tower 13.

In yet another embodiment, the line 16 feeds into a cyclone separator which separates the metal sulphide particles and coal fines from the liquid stream. The separated metal sulphide particles and coal fines are recycled into the feed slurry to tower 13, while the remaining liquid is collected in vessel 17.

The gaseous stream from hot separator 15 is carried by way of line 18 into a high pressure-low tempeature separator 19. Within this separator the product is separated into a gaseous stream rich in hydrogen which is drawn off through line 22 and an oil product which is drawn off through line 20 and collected at 21.

The hydrogen rich stream 22 is passed through a packed scrubbing tower 23 where it is scrubbed by means of a scrubbing liquid 24 which is cycled through the tower by means of pump 25 and recycle loop 26. The scrubbed hydrogen rich stream emerges from the scrubber via line 27 and is combined with fresh make up hydrogen added through line 28 and recycled through recycle gas pump 29 and line 30 back to tower 13.

Certain preferred embodiments of this invention will now be further illustrated by the following non-limitative examples.

EXAMPLE 1

An additive was prepared by crushing an Alberta sub-bituminous Whitewood coal in a hammer mill to particle sizes of less than about 8 to 16 mesh. This material was subsequently mixed with iron sulphate and heavy gas oil in a coal-iron sulphate:oil ratio of 35:15:50 and fed into a Drais Perl mill or Szego mill. Each product slurry contained about 50% solids and the iron content of each equivalent dry additive was 9 wt%.

For the purposes of comparison, an additive was also prepared in which 200 mesh coal particles were impregnated with iron sulphate in the form of the hepta hydrate and subsequently dried in the same manner as described in U.S. Pat. No. 4,214,977. The iron content of the dry additive was about 9 wt% and the moisture content was less than 2%.

Based upon the above procedures, four additives were prepared as shown in Table 1 below:

TABLE 1

|  | Impregnated | Oil/Co-Grind #1 | Oil/Co-Grind #2 | Oil/Co-Grind #3 |
|---|---|---|---|---|
| Coal | White wood Alberta SB | White wood Alberta SB | White wood Alberta SB | White wood Alberta SB |
| FeSO4 | Hepta Hydrate | Monohydrate | Monohydrate | Monohydrate |
| Oil | — | HVGO | HVGO | Fuel Oil #5 |
| Mill Used | — | Perl Mill | Szego Mill | Perl Mill |

The additives obtained were analyzed for particle size and the results obtained are shown in Table 2 below:

TABLE 2

| Particle Size Distribution | Impregnated | #1 | #2 | #3 |
|---|---|---|---|---|
| 100–75μ | 8 | — | 10 | — |
| 75–44μ | 17 | 8 | 23 | 6 |
| Less than 44μ | 75 | 92 | 67 | 94 |

The above additives were used in the hydrocracking of a heavy hydrocarbon oil having the following properties:

TABLE 3

| Feedstock Properties - IPPL 1050° + (3-IPPL84) | | |
|---|---|---|
| Gravity | °API | 7.36 |
| Specific gravity | 15/15° C. | 1.019 |
| Ash | wt % | 0.04 |
| Carbon | wt % | 86.4 |
| Hydrogen | wt % | 10.2 |
| Nitrogen | wt % | 0.47 |
| Sulphur | wt % | 2.45 |
| RCR | wt % | 20.4 |
| PI | wt % | 20.2 |
| TI | wt % | 0.70 |
| Viscosity | cP | |
| @100° C. | | 1889 |
| 150° C. | | 131.8 |
| Heat of combustion | kJ/kg | 42400 |
| V | ppmw | 102 |
| Ni | ppmw | 55 |
| Fe | ppmw | 124 |
| Ti | ppmw | 3 |
| Al | ppmw | 53 |
| Si | ppmw | 18 |
| Na | ppmw | 46 |
| K | ppmw | 31 |
| Ca | ppmw | 19 |
| Mg | ppmw | 12 |

A blended slurry of the above feedstock and either ½% or 1% by weight of mixed additives was prepared and this slurry was used as a feedstock for a series of bench scale hydrocracking tests. The bench scale unit was a continuous flow unit similar to the 1 bbl/day unit shown in FIG. 2 without scrubber and hydrogen recycle system.

The results of the above tests are shown in Table 4 below:

TABLE 4

| ADDITIVE TYPE | TEST 1 IMPREGNATED[1] | TEST 2 OIL/CO-GRIND[2] | TEST 3 IMPREGNATED[1] | TEST 4 OIL/CO-GRIND[2] | TEST 5 OIL/CO-GRIND[3] | TEST 6 OIL/CO-GROUND[4] |
|---|---|---|---|---|---|---|
| Additive Con.* Wt. % | 0.5 | 0.5 | 1.0 | 1.0 | 1.0 | 1.0 |
| Fe Conc. Wt. % (app.) | 0.045 | 0.045 | 0.09 | 0.09 | 0.09 | 0.09 |
| Run Duration (h) | 38 | 40 | 40 | 40 | 40 | 40 |
| Coke Deposit (g) | 27 | 2 | 2 | 4 | 1 | 2 |
| Pitch Conversion Wt. % | 81.9 | 81.9 | 78.4 | 78.0 | 81.2 | 82.1 |
| Product Yields Wt. % | | | | | | |
| C1-C3 | 5.1 | 5.1 | 4.7 | 4.7 | 5.0 | 5 |
| Naptha | 21.2 | 20.2 | 21.5 | 16.8 | 17.1 | 19.1 |
| Light Gas Oil | 29.2 | 28.9 | 26.3 | 26.3 | 26.6 | 27.6 |
| Heavy Gas Oil | 28.0 | 29.2 | 26.7 | 31.6 | 33.3 | 31.5 |
| Pitch | 16.5 | 16.6 | 20.8 | 20.6 | 18.0 | 16.7 |

*Equivalent to Conventional Additive on Dry Basis
[1]Conventional Tray Dried Impregnated Additive
[2]Oil/Coal-Grind Additive Produced with Perl Mill at Draiswerke
[3]Oil/Coal-Grind Additive Produced with Perl Mill at United Coal
[4]Oil/Coal-Grind Additive Produced with Szego Mill The above results show that the additive of this invention in very low concentration is highly effective in suppressing coke deposition in a reactor. It also provides pitch conversions at least as good or better than those obtained with similar amounts of impregnated coal catalyst.

operating conditions and results obtained are shown in Table 5.

TABLE 5

| No. of Days | 2 | 2 | 1 | 2 | 2 | 2 |
|---|---|---|---|---|---|---|
| CORRECTED OPERATING CONDITIONS | | | | | | |
| Charge Rate, BPD | 2680 | 3110 | 4020 | 4800 | 3030 | 3050 |
| Reaction Temp. °C. | 350–460 | 350–460 | 350–460 | 350–460 | 350–460 | 350–460 |
| Pressure, MPa | 13.9 | 13.9 | 13.9 | 13.9 | 13.9 | 13.9 |
| Additive Conc. in feed, % | 3.0 | 2.7 | 1.7 | 2.4 | 2.5 | 2.4 |
| Recycle Gas Purity, Vol. % | 85 | 85 | 85 | 85 | 85 | 85 |
| NET PRODUCT YIELDS | | | | | | |
| Gases, BFOE/D | 400 | 560 | 570 | 660 | 600 | 470 |
| Naptha, BPD | 450 | 540 | 690 | 820 | 610 | 500 |
| Distillate, BPD | 860 | 870 | 1020 | 1000 | 1020 | 1020 |
| VGO, BPD | 760 | 1000 | 1390 | 1800 | 910 | 750 |
| Pitch, BPD | 820 | 990 | 1340 | 1610 | 590 | 860 |
| GENERAL | | | | | | |
| Pitch Conversion wt. % | 67 | 66 | 64 | 64 | 77 | 68 |
| Total Yield of Distillates, Vol. % | 82 | 82 | 80 | 80 | 95 | 83 |

EXAMPLE 2

A blend of the feedstock used in Example 1 and 2.5 wt. % of Oil/Co-Grind #1 was prepared and used as feedstock to a 1 bbl/day pilot as illustrated in FIG. 2.

The reactor was operated under the following reactor conditions:

| | | Test #1 | Test #2 |
|---|---|---|---|
| Reactor temperature | °C. | 438 | 430–450 |
| Pressure | MPa | 13.9 | 13.9 |
| Liquid hourly space velocity | | 0.55 | 0.60 |
| Recycled gas rate | m³/h | 4.03 | 4.03 |
| Recycled gas purity (hydrogen) | vol % | 85 | 85 |

The results obtained from this run were as follows:

| | | Test #1 | #2 |
|---|---|---|---|
| Pitch (524° C.+) conversion | wt % | 61.6 | 30.8–86.7 |
| Duration of Run | (Days) | 18 | 18 |
| Coke Deposition | g. | 140 | 106 |

EXAMPLE 3

The feedstock of Example 1 was mixed with the oil/co-grind #3 of Example 1 in vary amounts and fed to a 5000 bbl/day refinery hydrocracking unit. The

We claim:

1. A process for producing a hydroconversion catalyst which comprises grinding carbonaceous particles and particles of an iron compound in the presence of an oil to form a paste or slurry in which the carbonaceous material and iron compound have been ground to particle sizes of less than 75 microns.

2. A process according to claim 1 wherein 10 to 90% by weight of an iron salt or oxide is mixed with 90 to 10% by weight of coal.

3. A process according to claim 2 wherein sufficient hydrocarbon oil is present to form a slurry or paste containing 10 to 60% by weight solids.

4. A process according to claim 3 wherein the iron salt is iron-sulphate.

5. A process according to claim 4 wherein the iron is ground to particle sizes of less than 10 microns.

6. A process according to claim 4 wherein the carbonaceous material is selected from lignite, coal, sub-bituminous coal, coal mine rejects and fly ash.

7. A process according to claim 4 wherein the grinding is carried out in an agitated ball mill.

8. A process according to claim 4, wherein the carbonaceous particles and iron compound are ground simultaneously in a single grinding mill.

9. A process according to claim 4, wherein the carbonaceous particles and iron compound are ground separately in separate grinding mills and the pastes or slurries obtained from the separate mills are combined.

* * * * *